United States Patent [19]

Sekigawa

[11] 4,393,452
[45] * Jul. 12, 1983

[54] METHOD OF REPRODUCING A PICTURE HAVING IMPROVED RESOLUTION

[75] Inventor: Keiji Sekigawa, Yokohama, Japan

[73] Assignee: Ricoh Co., Ltd., Tokyo, Japan

[*] Notice: The portion of the term of this patent subsequent to Apr. 6, 1999, has been disclaimed.

[21] Appl. No.: 155,179

[22] Filed: Jun. 2, 1980

[30] Foreign Application Priority Data

Jun. 2, 1979 [JP] Japan .................................. 54-69040

[51] Int. Cl.³ .......................... G06F 15/20; H04N 5/14
[52] U.S. Cl. .................................... 364/514; 358/166; 358/284; 382/50
[58] Field of Search ............... 358/260, 261, 262, 263, 358/280, 283, 284, 133, 166; 364/515

[56] References Cited

U.S. PATENT DOCUMENTS

| | | | |
|---|---|---|---|
| 3,462,547 | 8/1969 | Macovski | 358/133 |
| 4,124,870 | 11/1978 | Schatz et al. | 358/260 |
| 4,127,873 | 11/1978 | Katagi | 358/166 |
| 4,150,401 | 4/1979 | Yamamoto et al. | 358/284 X |
| 4,184,206 | 1/1980 | Harano | 364/515 |
| 4,214,277 | 7/1980 | Urich | 358/283 |
| 4,215,414 | 7/1980 | Huelsman | 364/515 |
| 4,231,095 | 10/1980 | Cassagne | 364/515 |
| 4,323,974 | 4/1982 | Sekigawa | 364/515 |

*Primary Examiner*—Felix D. Gruber
*Attorney, Agent, or Firm*—Oblon, Fisher, Spivak, McClelland & Maier

[57] ABSTRACT

In a picture processing method, the density data of picture elements in a particular picture element region in a 4×4 arrangement which is provided by decomposing an original picture into a number of picture elements are subjected to n-base quantization to provide density levels thereof, and the particular picture element region is divided into an aimed picture element region consisting of four picture elements in the central part of the particular picture element region and a surrounding region consisting of twelve picture elements surrounding the aimed picture element region. The aimed picture element region is converted into a minute picture element region in 3×3 arrangement consisting of nine minute picture elements. The estimation density levels of these minute picture elements are calculated according to particular equations by using the density levels of the picture elements in the particular picture element region, and are compared with the threshold levels in a predetermined threshold pattern provided for the minute picture element region, to determine whether the level of each minute picture element is "black" or "white".

1 Claim, 9 Drawing Figures

FIG. 1

| X1 | X2 | X3 | X4 |
|---|---|---|---|
| X5 | X6 | X7 | X8 |
| X9 | X10 | X11 | X12 |
| X13 | X14 | X15 | X16 |

FIG. 2

| Q1 | Q2 | Q3 | Q4 |
|---|---|---|---|
| Q5 | Q6 | Q7 | Q8 |
| Q9 | Q10 | Q11 | Q12 |
| Q13 | Q14 | Q15 | Q16 |

FIG. 3

| O1 | O2 | O3 |
|---|---|---|
| O4 | O5 | O6 |
| O7 | O8 | O9 |

| 15 | 7 | 13 | 5 |
|---|---|---|---|
| 3 | 11 | 1 | 9 |
| 12 | 4 | 14 | 6 |
| 0 | 8 | 2 | 10 |

FIG. 5

| 0 | 1 | 2 | 3 | 5 | 7 | 10 | 13 | 15 | 14 |
|---|---|---|---|---|---|---|---|---|---|
| 1 | 2 | 3 | 5 | 7 | 10 | 13 | 15 | 14 | 12 |
| 2 | 3 | 5 | 7 | 10 | 13 | 15 | 14 | 12 | 9 |
| 3 | 5 | 7 | 10 | 13 | 15 | 14 | 12 | 9 | 6 |
| 5 | 7 | 10 | 13 | 15 | 14 | 12 | 9 | 6 | 4 |
| 7 | 10 | 13 | 15 | 14 | 12 | 9 | 6 | 4 | 3 |
| 10 | 13 | 15 | 14 | 12 | 9 | 6 | 4 | 3 | 2 |
| 13 | 15 | 14 | 12 | 9 | 6 | 4 | 3 | 2 | 1 |

FIG. 6 PRIOR ART
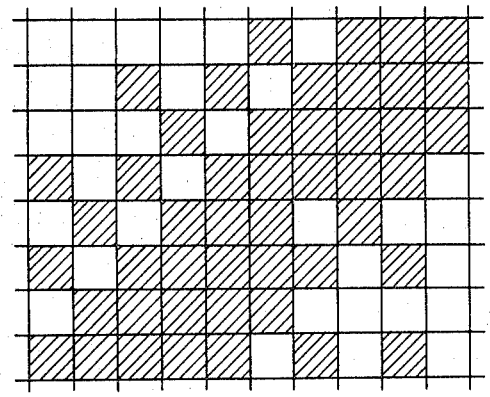
FIG. 7
| 0 | 0 | 1 | 2 | 2 | 3 | 4 | 5 | 7 | 9 | 11 | 13 | 14 | 14 | 14 |
|---|---|---|---|---|---|---|---|---|---|----|----|----|----|----|
| 0 | 1 | 2 | 2 | 3 | 5 | 5 | 7 | 10 | 11 | 13 | 14 | 14 | 14 | 12 |
| 1 | 2 | 2 | 3 | 5 | 6 | 7 | 10 | 11 | 13 | 14 | 15 | 14 | 12 | 11 |
| 2 | 2 | 3 | 4 | 5 | 7 | 9 | 11 | 13 | 14 | 14 | 14 | 13 | 11 | 9 |
| 2 | 3 | 5 | 5 | 7 | 10 | 11 | 13 | 14 | 14 | 14 | 12 | 11 | 9 | 7 |
| 3 | 5 | 6 | 7 | 10 | 11 | 13 | 14 | 15 | 14 | 12 | 11 | 9 | 7 | 5 |
| 4 | 5 | 7 | 9 | 11 | 13 | 14 | 14 | 14 | 13 | 11 | 9 | 7 | 6 | 4 |
| 5 | 7 | 10 | 11 | 13 | 14 | 14 | 14 | 12 | 11 | 9 | 7 | 6 | 4 | 3 |
| 7 | 10 | 11 | 13 | 14 | 15 | 14 | 12 | 11 | 9 | 7 | 5 | 4 | 3 | 3 |
| 9 | 11 | 13 | 14 | 14 | 14 | 13 | 11 | 9 | 7 | 6 | 4 | 3 | 3 | 2 |
| 11 | 13 | 14 | 14 | 14 | 12 | 11 | 9 | 7 | 6 | 4 | 3 | 3 | 2 | 1 |
| 13 | 14 | 15 | 14 | 12 | 11 | 9 | 7 | 5 | 4 | 3 | 3 | 2 | 1 | 1 |
FIG. 8
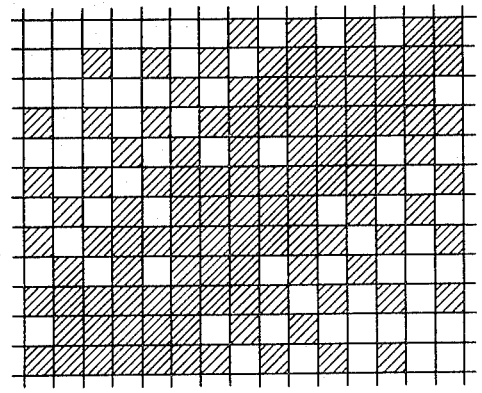

METHOD OF REPRODUCING A PICTURE HAVING IMPROVED RESOLUTION

BACKGROUND OF THE INVENTION

This invention relates to a picture processing method in which a picture including half-tones is reproduced with binary outputs.

In general, a digital type copying machine or a picture input and output device such as a facsimile unit has a serious problem to be solved. That is, in the case where a video signal read at the input side is transmitted to the output side, it is desirable to improve the efficiency of transmission of the video signal, and when it is required to store the contents of the video signal, it is preferable to reduce the storage capacity as much as possible, and yet it is required that a picture reproduced with binary outputs at the output side is as similar to the original picture as possible.

In the art, a so-called "systematic dither method" is known as a method in which a picture such as a photograph including half-tones is scanned for every picture element to provide a video signal, which is processed to produce a high tone picture with binary outputs. In the systematic dither method, a picture made up of picture elements in matrix form is covered, in its entirety, with a sub-matrix in nxn arrangement, and a dither pattern which has been provided for the sub-matrix in advance is employed, so that the level of each picture element is determined as "black" or "white" with the dither values in the dither pattern as threshold values.

However, the systematic dither method is disadvantageous in the following point: When picture data obtained by sampling a picture including half-tones at a picture element density of n pel/mm are subjected to dither process, then the output picture will have a picture element density of n pel/mm. Therefore, even if the original picture is read by sampling it at a low picture element density in order to improve the efficiency of transmission as described above and the picture data are subjected to a dither process, the produced picture is low in resolution. That is, it is impossible for the systematic dither method to produce a half-tone picture which is excellent in reproducibility.

SUMMARY OF THE INVENTION

In view of the foregoing, an object of this invention is to provide a picture processing method in which a picture including half-tones can be reproduced into a high-tone picture high in resolution with binary outputs.

The picture processing method of the invention is based on the fact that, in a sampled picture obtained by scanning an original picture for every picture element, the density data of an aimed picture element is in close correlation with those of the picture elements which surround the aimed picture element. That is, in the method, in order that the picture element density of a picture which has been sampled at a low picture element density of n pel/mm is increased to 1.5 pel/mm, an aimed picture element region in 2×2 arrangement is converted into a minute picture element region in 3×3 arrangement. The estimation density levels of the minute picture elements are calculated according to particular equations by using the density levels of the picture elements in the aimed picture element region and those of the picture elements surrounding the aimed picture element region. The results of calculation are compared with threshold levels in a threshold pattern which has been provided in advance, so that the level of each minute picture element is determined as "black" or "white".

The nature, principle and utility of the invention will become more apparent from the following detailed description when read in conjunction with the accompanying drawings.

BRIEF DESCRIPTION OF THE DRAWINGS

In the accompanying drawings:

FIG. 1 is a diagram showing a particular picture element region which is obtained by decomposing an original picture into picture elements;

FIG. 2 is a diagram showing the density levels of the picture elements in the particular picture element region which are subjected to multi-base quantization;

FIG. 3 is a diagram showing a minute picture element region in 3×3 arrangement which is converted from an aimed picture element region in 2×2 in the particular picture element region;

FIG. 4 is a diagram showing one example of a threshold pattern employed in a picture processing method according to this invention;

FIG. 5 is a diagram showing one example of the density levels of picture elements in an original picture which are subjected to hexadecimal quantization;

FIG. 6 is a diagram showing a picture which is produced by being processed with the data in FIG. 5 according to a conventional systematic dither method;

FIG. 7 is a diagram showing the estimation density levels of minute picture elements provided when the picture element density is increased by using the data in FIG. 5 according to the picture processing method of the invention;

FIG. 8 is a diagram showing a picture which is produced by being processed with the data in FIG. 5 according to the picture processing method of the invention.

DETAILED DESCRIPTION OF THE INVENTION

Figure 9:
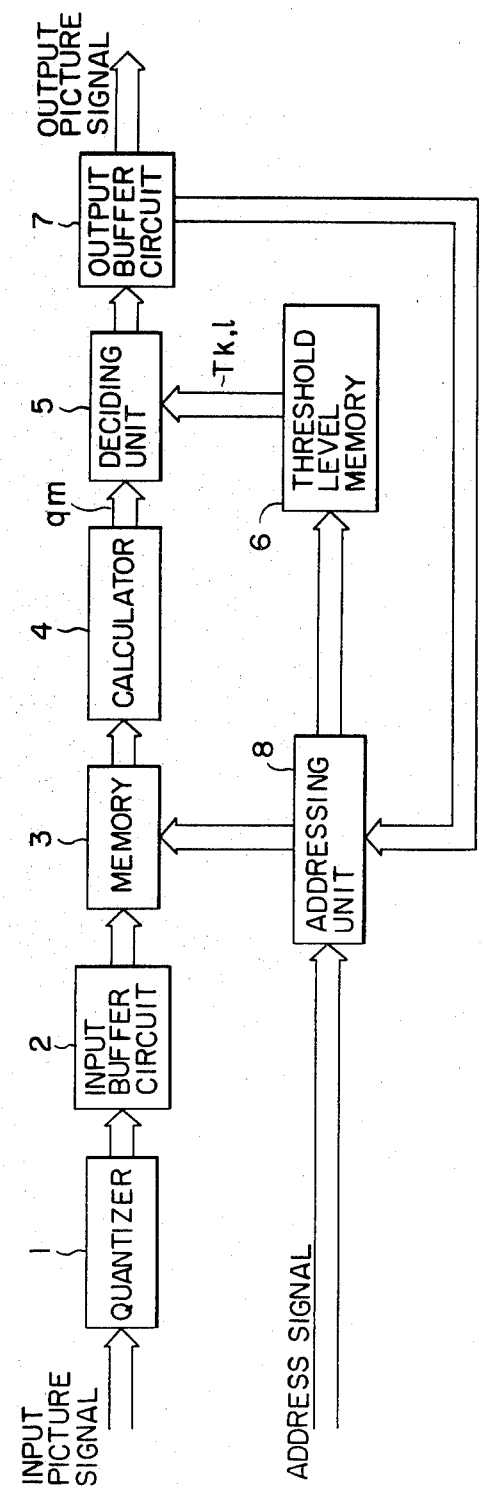
FIG. 9 is a block diagram showing one example of an apparatus for practicing the picture processing method of the invention.

One embodiment of this invention will be described with reference to the accompanying drawings.

FIG. 1 shows a particular picture element region in 4×4 picture element arrangement. More specifically, the particular picture element region, as shown in FIG. 1, has sixteen (4×4) picture elements which are obtained by decomposing an original picture into a number of picture elements. The density levels $Q_1$ through $Q_{16}$ of the picture elements $X_1$ through $X_{16}$ in the region can be obtained by subjecting the density data of the picture elements $X_1$ through $X_{16}$ to n-base quantization, as shown in FIG. 2.

In the picture processing method according to the invention, a region consisting of four picture elements $X_6$, $X_7$, $X_{10}$ and $X_{11}$ in the particular picture element region will be referred to as "an aimed picture element region". This aimed picture element region is converted into a minute picture element region in 3×3 arrangement consisting of minute picture elements $O_1$ through $O_9$ as shown in FIG. 3. Then, the estimation density levels $q_1$ through $q_9$ of the minute picture elements $O_1$ through $O_9$ are calculated according to the following equations (1), respectively:

$$\left.\begin{array}{l}q_1 = a_1 \cdot Q_1 + a_2 \cdot Q_2 + a_2 \cdot Q_5 + a_3 \cdot Q_6 \\ q_2 = a_6 \cdot Q_2 + a_6 \cdot Q_3 + a_4 \cdot Q_6 + a_4 \cdot Q_7 \\ q_3 = a_2 \cdot Q_3 + a_1 \cdot Q_4 + a_3 \cdot Q_7 + a_2 \cdot Q_8 \\ q_4 = a_6 \cdot Q_5 + a_4 \cdot Q_6 + a_6 \cdot Q_9 + a_4 \cdot Q_{10} \\ q_5 = a_5 \cdot Q_6 + a_5 \cdot Q_7 + a_5 \cdot Q_{10} + a_5 \cdot Q_{11} \\ q_6 = a_4 \cdot Q_7 + a_6 \cdot Q_8 + a_4 \cdot Q_{11} + a_6 \cdot Q_{12} \\ q_7 = a_2 \cdot Q_9 + a_3 \cdot Q_{10} + a_1 \cdot Q_{13} + a_2 \cdot Q_{14} \\ q_8 = a_4 \cdot Q_{10} + a_4 \cdot Q_{11} + a_6 \cdot Q_{14} + a_6 \cdot Q_{15} \\ q_9 = a_3 \cdot Q_{11} + a_2 \cdot Q_{12} + a_2 \cdot Q_{15} + a_1 \cdot Q_{16}\end{array}\right\} \quad (1)$$

where $a_1$ through $a_6$ are the weight factors for the minute picture elements, and $a_1 + 2a_2 + a_3 = 1$, $2a_6 + 2a_4 = 1$, and $4a_5 = 1$.

In the picture processing method of the invention, a threshold pattern, in which threshold levels $T_{k,1}$ are provided in matrix form as shown in FIG. 4, is prepared in advance. The estimation density levels $q_m$ (m=1 through 9) of the minute picture elements $O_1$ through $O_9$ are compared with the corresponding threshold levels $T_{k,1}$, so that the density level of each of the minute picture elements $O_1$ through 9 is determined according to the following conditions:

(I) When $q_m \geq T_{k,1}$, $O_1, O_2, \ldots O_9 =$ "1" (black level)

(II) When $q_m < T_{k,1}$, $O_1, O_2, \ldots O_9 =$ "0" (white level)

The above-described processing is carried out for the entire surface of the original picture, and a half-tone picture higher in picture element density an improved resolution is provided by the binary outputs.

FIG. 5 shows one example of the density levels, expressed in hexadecimal quantization, of the picture elements of an original picture. If this original picture is processed with a dither pattern similar to that of FIG. 4 according to the conventional systematic dither method, then the produced picture is as shown in FIG. 6. If the same original picture is processed according to the picture processing method of the invention, the picture element density is increased and the estimation density levels of the minute picture elements are as shown in FIG. 7. And when the estimation density levels are processed with the threshold pattern shown in FIG. 4, the produced picture is as shown in FIG. 8. In the picture processing operation, the weight factors are as follows:

$a_1 = 0$, $a_2 = 1/6$, $a_3 = 4/6$, $a_4 = 2/6$, $a_5 = \frac{1}{4}$, and $a_6 = 1/6$ As is clear from the comparison between FIGS. 6 and 8, the picture produced according to the picture processing method of the invention is higher in resolution and smoother than that according to the conventional systematic dither method.

FIG. 9 shows one example of an apparatus for practicing the picture processing method according to the invention. In the apparatus, input picture element signals provided by scanning an original picture including half-tones are applied to a quantizer 1, so that the density data thereof are subjected to multi-base quantization. The signals thus quantized are applied successively through an input buffer circuit 2 to a memory 3, so that the density levels in a particular picture element region are collectively stored in the memory 3 temporarily. Then, according to the content of the memory 3, a calculator 4 calculates the estimation density levels $q_1$ through $q_9$ of the minute picture elements in a minute picture element region in 3×3 arrangement which is converted from an aimed picture element region in 2×2 arrangement. The estimation density levels thus calculated are applied to a deciding unit 5. The threshold levels $T_{k,1}$ corresponding to the minute picture elements are read out of a threshold level memory 6 in which a threshold pattern as shown in FIG. 4 has been stored, so that the estimation density levels $q_m$ are compared with the threshold levels $T_{k,1}$ in the deciding unit 5, and according to the results of comparison the levels of the minute picture elements are determined as "black" or "white". The output of the deciding unit 5 is delivered, as a binary output picture element signal, through an output buffer circuit 7 to the outside. In FIG. 9, reference numeral 8 designates an addressing unit which, according to an address signal applied from the outside and with the timing of the output signal of the output buffer circuit, performs both addressing for calling picture element data necessary for calculation to the memory 3 and addressing for calling the threshold levels corresponding to the minute picture elements to be processed from the memory 6.

As is apparent from the above description, in the picture processing method of the invention, when a picture including half-tones is reproduced through estimation with binary outputs, an aimed picture element region in 2×2 arrangement is converted into a minute picture element region in 3×3 arrangement, and the estimation density levels of the minute picture elements are calculated, according to the particular equations including the weight factors for the minute picture elements, by using the density levels (expressed in multi-base quantization) of the picture elements in the aimed picture element region and the density levels of the picture elements surrounding the aimed picture element region. Then, the results of calculation are compared with the threshold levels, corresponding to the minute picture elements, in the preset threshold pattern, so that the level of each minute picture element is determined as "black" or "white".

Thus, the invention has excellent merits that a high tone picture can be produced with binary outputs, and the produced picture is high in picture element density, resolution and quality.

What is claimed is:

1. A method of reproducing a picture including half-tones through estimation with binary outputs, wherein said picture is divided into a predetermined number of picture elements defining a matrix and each picture element within said matrix is assigned a density level, comprising the steps of:

subdividing said matrix of picture elemtns into plural 2×2 sub-matrices;

converting each 2×2 sub-matrix into a higher resolution 3×3 sub-matrix of picture elements, comprising, calculating density levels for each of said picture elements in said 3×3 sub-matrix according to predetermined equations including weight factors for each of the density levels of said picture elements in the 2×2 sub-matrix and those of the picture elements surrounding said 2×2 sub-matrix;

comparing the calculated density levels with respective predetermined threshold levels, thereby to determine an output level of each picture element of each of said 3×3 sub-matrices is black or white in dependence on whether or not the calculated density levels exceed the predetermined threshold levels, and reproducing said picture based on the respective output levels of each of said picture elements of each of said 3×3 matrices determined in said comparing step; in which said predetermined equations are $$q_1 = a_1 \cdot Q_1 + a_2 \cdot Q_2 + a_2 \cdot Q_5 + a_3 \cdot Q_6$$

$$q_2 = a_6 \cdot Q_2 + a_6 \cdot Q_3 + a_4 \cdot Q_6 + a_4 \cdot Q_7$$

$$q_3 = a_2 \cdot Q_3 + a_1 \cdot Q_4 + a_3 \cdot Q_7 + a_2 \cdot Q_8$$

$$q_4 = a_6 \cdot Q_5 + a_4 \cdot Q_6 + a_6 \cdot Q_9 + a_4 \cdot Q_{10}$$

$$q_5 = a_5 \cdot Q_6 + a_5 \cdot Q_7 + a_5 \cdot Q_{10} + a_5 \cdot Q_{11}$$

$$q_6 = a_4 \cdot Q_7 + a_6 \cdot Q_8 + a_4 \cdot Q_{11} + a_6 \cdot Q_{12}$$

$$q_7 = a_2 \cdot Q_9 + a_3 \cdot Q_{10} + a_1 \cdot Q_{13} + a_2 \cdot Q_{14}$$

$$q_8 = a_4 \cdot Q_{10} + a_4 \cdot Q_{11} + a_6 \cdot Q_{14} + a_6 \cdot Q_{15}$$

$$q_9 = a_3 \cdot Q_{11} + a_2 \cdot Q_{12} + a_2 \cdot Q_{15} + a_1 \cdot Q_{16}$$

where $q_1$ through $q_9$ are the calculated density levels of said picture elements of said 3×3 matrix, $Q_1$ through $Q_{16}$ are the density levels of said picture elements in said 2×2 sub-matrix and of said picture elements surrounding said 2×2 sub-matrix and are expressed in multi-base quantization, and $a_1$ through $a_6$ are the weight factors for said minute picture elements, with $a_1 + 2a_2 + a_3 = 1$, $2a_6 + 2a_4 = 1$ and $4a_5 = 1$.

* * * * *